United States Patent [19]

Rzeszewski

[11] Patent Number: 4,979,228

[45] Date of Patent: Dec. 18, 1990

[54] VIDEO SIGNAL ENHANCEMENT BY ADAPTIVE DIGITAL SIGNAL PROCESSING

[75] Inventor: Theodore S. Rzeszewski, Lombard, Ill.

[73] Assignee: AT&T Bell Laboratories, Murray Hill, N.J.

[21] Appl. No.: 274,607

[22] Filed: Nov. 22, 1988

Related U.S. Application Data

[63] Continuation of Ser. No. 913,701, Sep. 30, 1986, abandoned.

[51] Int. Cl.$^5$ .............................................. G06K 9/40
[52] U.S. Cl. .................................... 382/54; 358/138; 358/166; 382/21
[58] Field of Search ....................... 382/54, 55, 47, 21, 382/22, 41; 358/37, 166, 213.22, 138; 364/723, 577, 521

[56] References Cited

U.S. PATENT DOCUMENTS

| | | | |
|---|---|---|---|
| 4,163,257 | 7/1979 | White | 382/54 |
| 4,303,947 | 12/1981 | Stoffel | 382/54 |
| 4,569,081 | 2/1986 | Mintzer et al. | 382/47 |
| 4,609,993 | 9/1986 | Shimizu | 364/521 |
| 4,631,751 | 12/1986 | Anderson et al. | 382/47 |
| 4,661,849 | 4/1987 | Hinman | 358/138 |
| 4,680,720 | 7/1987 | Yoshii et al. | 364/521 |

OTHER PUBLICATIONS

Zaperoni, Piero; "Improvement of Picture Quality for Low Pass Limited Television Signals", English translation of German article: "Die Verbesserung der Bildqualitat bei tiefpassbegrenzten Fernsehsignalen", Wissenschaftliche Berichte A.E.G., vol. 45, No. ½, 1972, pp. 36-47; P. Zamperoni.

"An Edge Enhacement Algorithm Using a Polynomial Transformation", F. Fonsalas, J. Y. Lejard, IEEE 86/Jun. 9, 1986, pp. 151-154.

"Picture Crispening by Adaptive Digital Signal Processing", P. H. Wyant, T. S. Rzeszewski; IEEE Transactions on Consumer Electronics, vol.CE-33, No. 2, May 1987, pp. 71-75, IEEE, New York, N.Y., U.S.

"An Edge Enhancement Algorithm Using a Polynomial Transformation", F. Fonsalas, J. Y. Lejard, ICCE 86/Jun. 4, 1986, pp. 14-15.

"Image Filtering for Edge Enhancement", Benjamin M. Dawson, Photonics Spectra Feb. 1986, p. 93, 94, 96 and 98.

"New Filter Technology in Picture Processing", Takashi Okada, Yutaka Tanaka and Toshinobu Isobe, IEEE 1982, pp. 157-166.

"The K-Forms a New Technic and Its Applications in Digital Picture Processing", Azzedine KACED, IEEE 1980, pp. 933-936.

*Primary Examiner*—David K. Moore
*Assistant Examiner*—Joseph Mancoso
*Attorney, Agent, or Firm*—John C. Moran

[57] ABSTRACT

A digital subsystem for improving the resolution of a TV digital signal by inserting additional digital samples into the digital TV signal in response to the correspondence of the digital signal and predefined patterns. The digital subsystem is a logic circuit which is responsive to received digital samples to group these digital samples into sets of samples. The digital circuit then calculates the slope between pairs of digital samples of each set and utilizes the calculated slopes to determine the correspondence to the predefined patterns. The determined predefined pattern designates the digital sample to be inserted into each set. The inserted digital sample is either equal to one of the digital samples or the average between two of the digital samples of each set. The calculation of the slopes results in a logical "0" for a constant slope and a logical "1" for a negative or a positive slope. An Exclusive OR gate is utilized to make the determination of whether to use a value equal to one of the digital samples of the set or the average of the value of two of the digital samples. A slope is considered constant if the difference between the pair of digital samples is less than a value calculated from range information of the set of samples.

14 Claims, 6 Drawing Sheets

VIDEO SIGNAL ENHANCEMENT BY ADAPTIVE DIGITAL SIGNAL PROCESSING

CROSS-REFERENCE TO RELATED APPLICATION

This application is a continuation application Ser. No. 913,701, filed on Sept. 30, 1986 now abandoned.

TECHNICAL FIELD

My invention relates to digital video processing, and more particularly to digital arrangements for sharpening the edges, or crispening, of video pictures through digital signal processing within a video receiver.

PROBLEM

A common technique for giving an apparent improvement in resolution in an analog television, TV, receiver is to have an adjustment called a peaking or sharpness control. Even in those TV receivers that lack any peaking control, there is normally some amount of fixed peaking incorporated into the design to improve the transient response. Peaking of the baseband signal at the receiver is an attempt to compensate for finite transmission bandwidth that produces poor rise and fall times. The objective of peaking is to produce a crisper-looking picture that appears to have more resolution also referred to as detail. The use of peaking to improve the apparent resolution has also been utilized in digital TV receivers. For example, digital TV receivers are disclosed in an article by R. Duebert entitled "Feature IC's For Digivision TV Sets", *IEEE Transactions on Consumer Electronics,* Vol. CE-29, pp. 237–241, August 1983, or an article by Thomas Fischer, entitled "What is the Impact of Digital TV?", *IEEE, Transactions on Consumer Electronics,* Vol. CE-28, No. 3, August 1982.

Whereas, the use of peaking for improving the apparent resolution of a TV picture has been utilized for a number of years, this technique does suffer from the following problems: ringing of the time domain response on sharp edges, emphasis of the high frequencies compared to the low frequencies, increased amount of noise in the picture, and excessive preshoot or overshoot, or both, at a transient edge. In addition, the implementation of peaking in digital receivers has consumed a disproportionate amount of the digital processing capabilities of a digital receiver.

SOLUTION

The foregoing problems are solved and a departure in the art is achieved by a structural embodiment and a method whereby digital logical decisions based on predefined patterns are utilized to insert additional digital samples into received digital samples representing the TV signal to enhance the resolution of the latter signal but avoid introducing the previous mentioned problems associated with peaking.

Advantageously, the received digital signal samples are grouped into a plurality of groups of samples, and a logic circuit determines predefined patterns of digital samples within each of these groups and inserts additional digital samples within each group based on the determined predefined pattern for each group.

Specifically, the logic circuit groups the digital samples into sets of digital samples. The logic circuit then calculates the slope between digital samples of each of the sets and on the basis of these calculated slopes performs a logical comparison between the set and a plurality of predefined patterns which are characterized in terms of slopes.

The logic circuit groups the incoming samples into sets each containing three samples. The logic circuit then generates a first type of signal if the slope between a pair of samples is not constant and a second type of signal if the slope between a pair of samples is positive or negative. The logic circuit utilizes an Exclusive OR gate to perform a comparison. The Exclusive OR gate is responsive to receipt of a first and a second of type signal to generate a third signal and is responsive to both inputs being a first type signal or a second type signal for generating a fourth signal. The logical signal utilizes a multiplexer which is responsive to the third signal for inserting a digital sample which is equal to one of the digital samples in the set which illustratively is the middle sample of the set and is further responsive to the fourth signal for inserting a digital sample which is equal to the average of two of the samples of the set.

DETAILED DESCRIPTION

Figure 1:
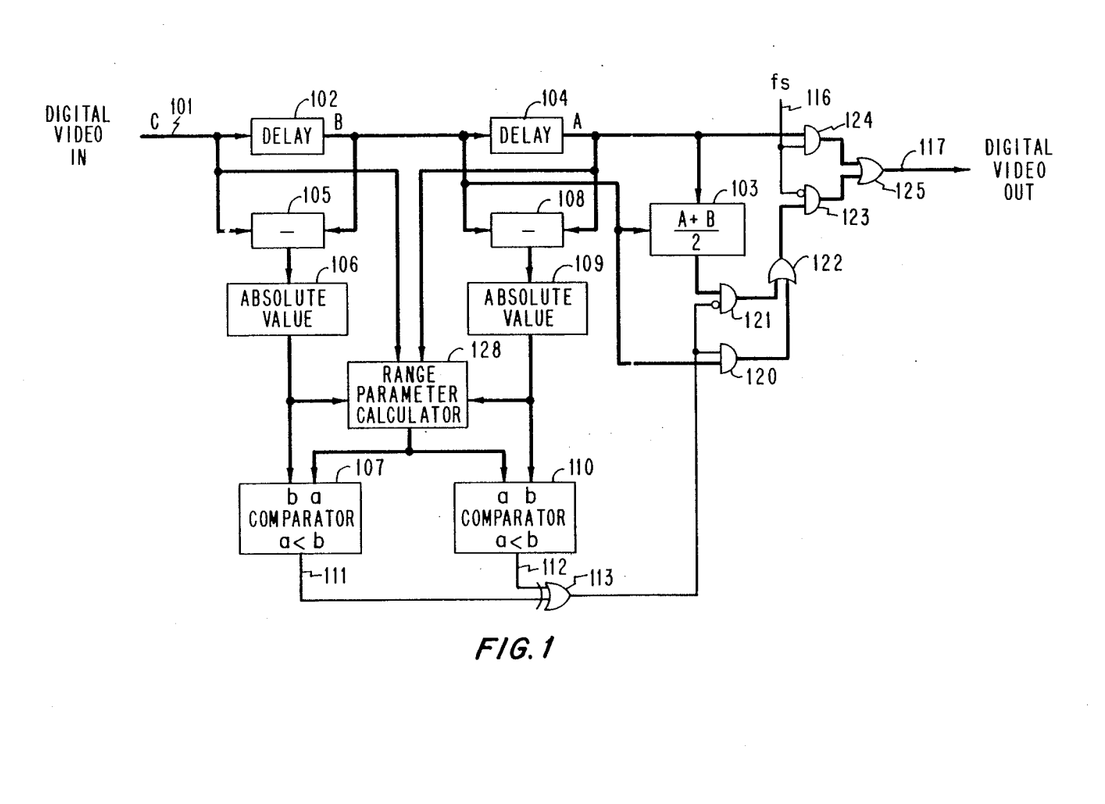
FIG. 1 illustrates a first embodiment of a logic circuit for determining which of the patterns illustrated in FIG. 2 is to be utilized for inserting a sample into a received digital video signal.

FIG. 1 illustrates a logic circuit for crispening or improving the apparent resolution of a digital video signal. The circuit would be utilized in digital TV receivers such as the one described in the aforementioned article by Duebert. The circuit would replace the peaking circuit of FIG. 2 as disclosed in the article by Duebert. The circuit of FIG. 1 inserts an additional sample between each of the received digitized samples on input bus 101 thereby doubling the sample rate. The value of the sample inserted is determined by comparing three samples received from input bus 101 with the patterns illustrated in FIG. 2. The three sample points are compared against the patterns illustrated in FIG. 2 by the circuit of FIG. 1 are designated C, B, and A, with B being the present sample, C being the next sample, and A being the previous sample. Sample A is first placed on output bus 117, followed by the inserted sample.

Figure 2:
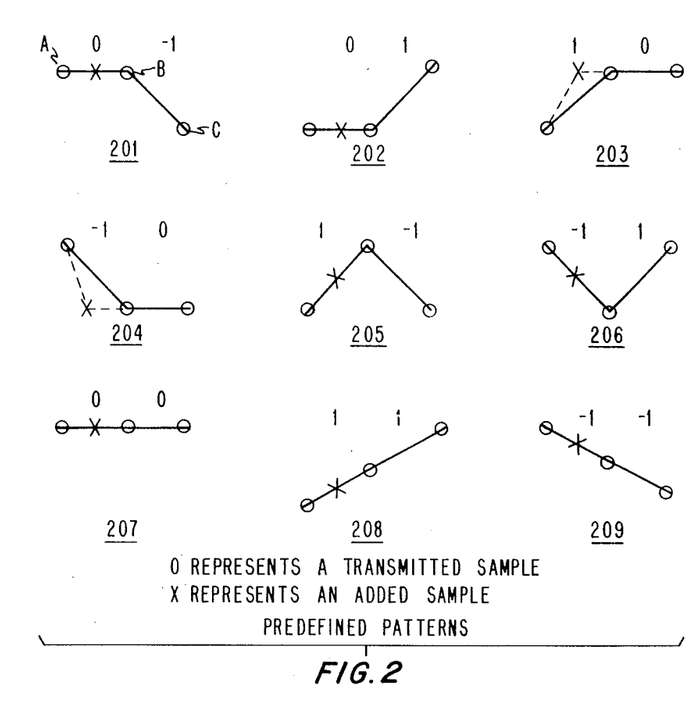
FIG. 2 illustrates in graphic form a set of predefined patterns in accordance with this invention.

Illustrated in Fig. 2 are the predefined patterns that are used by the circuit of FIG. 1. The numerical designations given on FIG. 2 indicate whether the slope of the signal is constant (0) or negative (−1) or positive (1). For the slope to be considered constant, the difference between the two samples must be less than a value K, which advantageously may have the value of 25 percent of the maximum range between any combination of the samples A, B, or C if this maximum range is greater than advantageously one-sixteenth of the total dynamic range. For example, pattern 201 of FIG. 2 has a slope of "0" between samples A and B indicating that the difference between samples A and B is less than the value K. By the same token, the slope between sample B and sample C is designated as a "−1" which means that the absolute value of C subtracted from B is greater than the value K. In FIG. 2, a sample designated by a circle means that it is a sample received via bus 101, and a sample designated by an X is an inserted sample.

Consider now the operation of the circuit in FIG. 1 in greater detail. As digital samples are received on bus 101, they are processed through delay blocks 102 and 104. The sample being received on bus 101 is the next sample and is designated as C, the output of delay block 102 is the present sample and is designated as B, and the output of delay block 104 is the previous sample and is designated as A. The circuit of FIG. 1 is responsive to a clock signal, fs, received via conductor 116 being a logical "0" (low logic level) to either place the present sample B on output bus 117 or to determine a new sample and place it on output bus 117. The clock signal is received from the remainder of the digital receiver. When fs is a "1", (a high logic level) sample A is gated onto the latter bus. When the previous sample, A, is to be placed on output bus 117, the fs signal received via conductor 116 being "1" enables AND gates 124 which transfers the A sample via OR gates 125 to bus 117. When the inserted sample is to be placed on output bus 117, a "0" is received via conductor 116 that selects the output of OR gates 122. The latter output is the sample to be inserted, and the insertion is performed by enabling AND gates 123 which place the inserted sample onto bus 117 via OR gates 125.

Consider now how the inserted sample is determined. Blocks 105 through 107 determine whether the slope between samples C and B is constant or either negative or positive; similarly, blocks 108 through 110 make the same determination for the slope between samples B and A. If the slope between samples C and B is constant, the output of block 107 is a "0"; whereas, if the slope is negative or positive, the output of block 107 is a "1". Blocks 108 through 110 function in the same manner with respect to samples B and A. For patterns 201 through 204, the output of Exclusive OR gate 113 is a "1". For example, with respect to pattern 201 the output of block 107 is a "1" whereas the output of block 110 is a "0". Exclusive OR gate 113 is responsive to the output from blocks 107 and 110 being "1" and "0", respectively, to transmit a "1" to gates 120 and 121 which results in gate 120 transferring the B sample to OR gate 122. For patterns 205 through 209 of FIG. 2, the output of Exclusive OR gate 113 is "0" since Exclusive OR gate 113 is either receiving a "0" from blocks 107 and 110 or "1" from blocks 107 and 110 for the latter patterns. AND gates 121 are responsive to the output of gate 113 being a "0" to transfer the output of block 103 to OR gates 122. During the logical "0" part of the fs signal, the inserted sample is placed on output bus 117, and the output of Exclusive OR gate 113 controls whether the output of block 102 or block 103 is transferred to OR gates 125 via gates 120 through 123. If the output of Exclusive OR gate 113 is a "1" gates 120 through 123 select the B sample onto output bus 117. However, if the output of Exclusive OR gate 113 is a "0" then the average between samples A and B is placed on bus 117 by gates 121 through 123 selecting the output of block 103.

Figure 3:
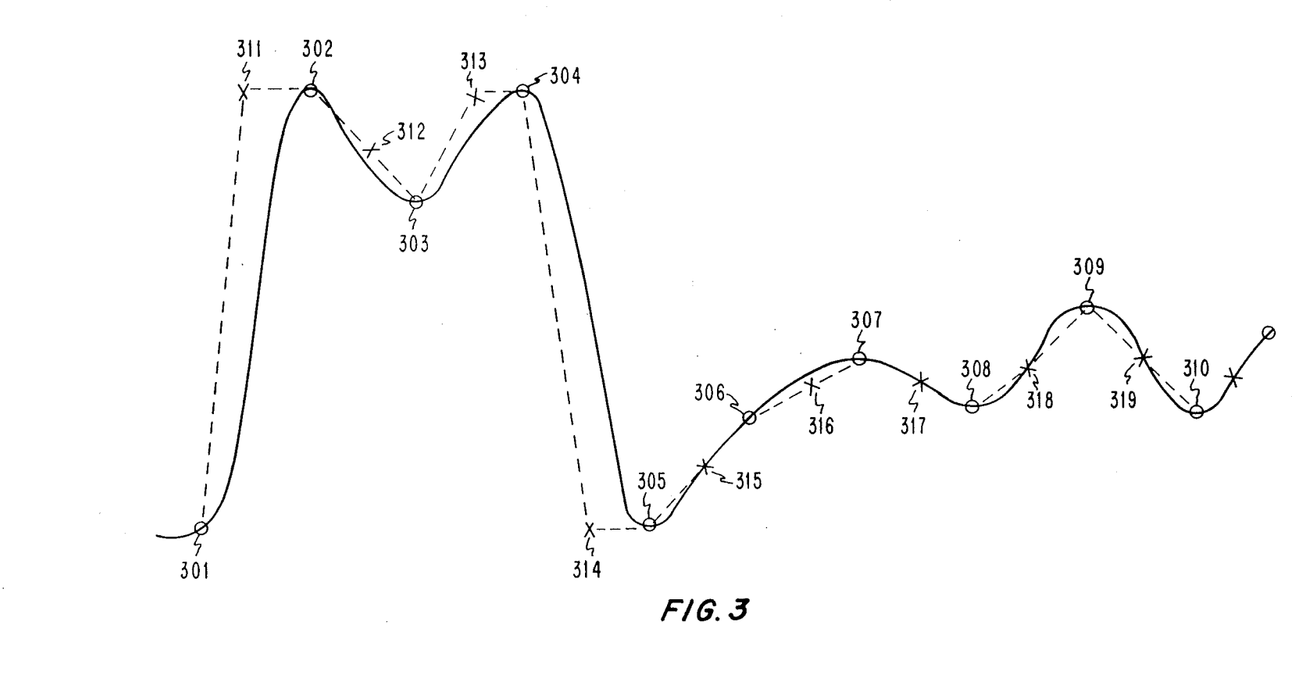
FIG. 3 illustrates in graphical form a digital video signal whose resolution has been enhanced by the logic circuit of FIG. 1.

FIG. 3 illustrates the response of the circuit of FIG. 1 to an input signal whose analog form is illustrated in FIG. 3 as a solid line. The samples which are represented by circles are the samples received via bus 101, and the samples represented by Xs are the inserted samples which, along with the received samples, are transmitted via output bus 117. For example, when sample 302 is the present sample, sample B, the circuit of FIG. 1 recognizes this as pattern 203 since the difference between sample 302 and sample 303 is less than the value K calculated by range parameter calculator 128. Since the pattern is 203, the inserted sample 311 is equal to the present sample 302. When sample 303 is the present sample, the circuit recognizes the pattern as pattern 206 resulting in the inserted sample 312 being equal to the average of samples 302 and 303. Pattern 206 is identified rather than pattern 207 since the difference between samples 302 and 303 and the difference between samples 303 and 304 are both greater than the calculated value K. When sample 304 is the present sample, the circuit identifies the pattern as pattern 201 resulting in the inserted sample 313 being equal to the present sample 304. When the present sample is sample 305, the circuit determines that the pattern is pattern 204 resulting in the inserted sample of 314 being equal to the present sample 305. Inserted points 315 through 319 result from the circuit determining that the patterns generating these inserting points are patterns 205, 206, or 208 since the differences between any pair of received points, such as points 305 and 306, is greater than the calculated value K for received points 305 through 310.

Figure 4:
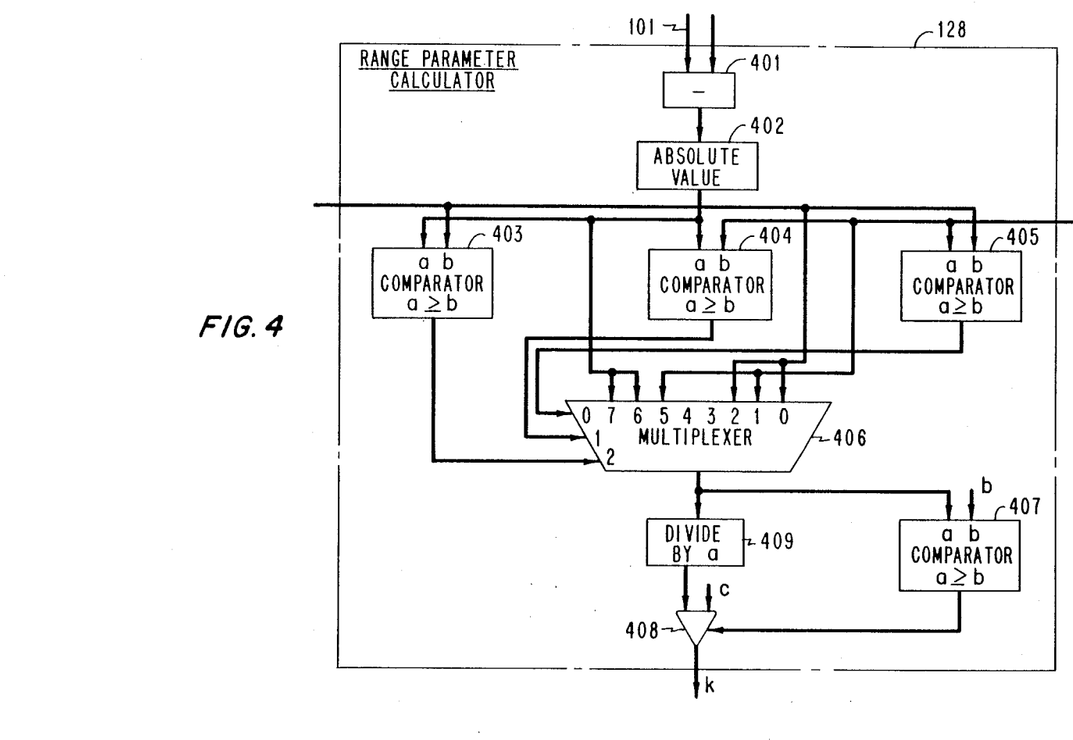
FIG. 4 illustrates the details of block 128 of FIG. 1.

FIG. 4 illustrates in greater detail block 128 of FIG. 1. Block 128 determines the range occupied by samples A, B, and C; and if the largest range is greater than a constant b which advantageously is 1/16 of the total dynamic range, the largest range is divided by a constant a, which advantageously may be 25 percent of the total dynamic range, and the result of the division operation is selected as the value K. If the maximum range between the samples is less than the constant b, then K is set equal to a constant c which advantageously may be 1/64 of the dynamic range.

Blocks 401 and 402 calculate the absolute value of the difference between samples A and C by a calculation that is similar to the calculation that is performed by blocks 106 and 107 of FIG. 1. In conjunction with multiplexer 406, comparators 403, 404, and 405 determine which range is the largest. Multiplexer 406 is responsive to the outputs of the comparators 403 through 405 for selecting the largest range. Once the range has been selected and placed on the output of multiplexer 406, comparator 407 compares this range with the constant b. If the selected range is greater than the constant b, then multiplexer 408 selects the output of block 409 which is the selected range divided by the constant a. If the selected range is not greater than the constant b, then comparator 407 controls multiplexer 408 to select the constant c as the value of K.

Figure 5:
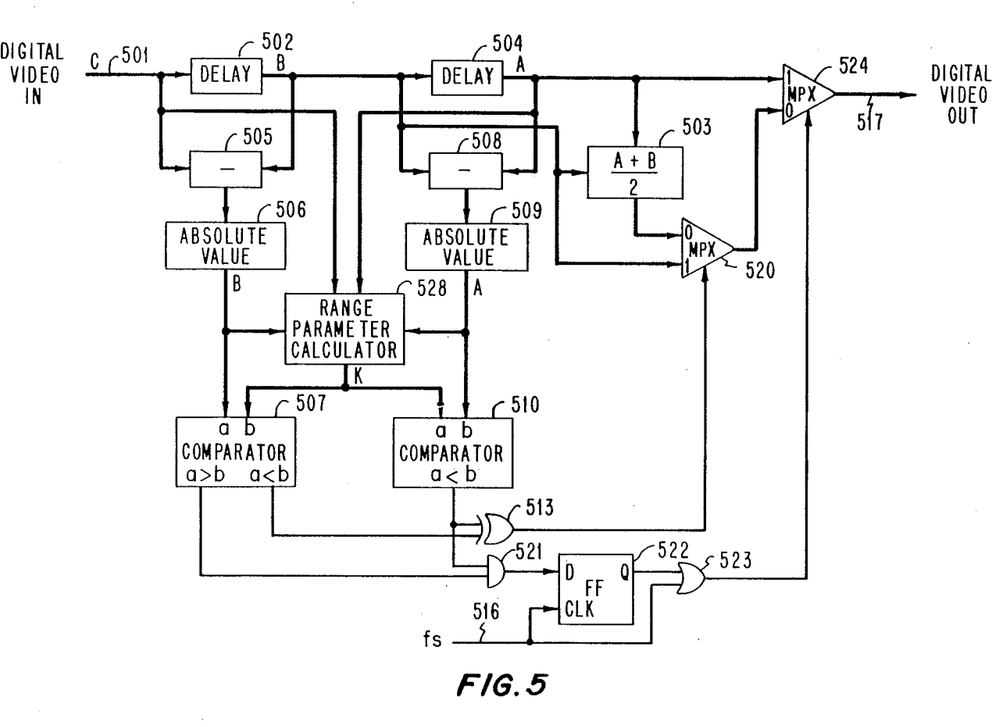
FIG. 5 illustrates a second embodiment of a logic circuit for determining which of the patterns illustrated in FIG. 6 are to be utilized for inserting samples into a received digital video signal.
Figure 6:
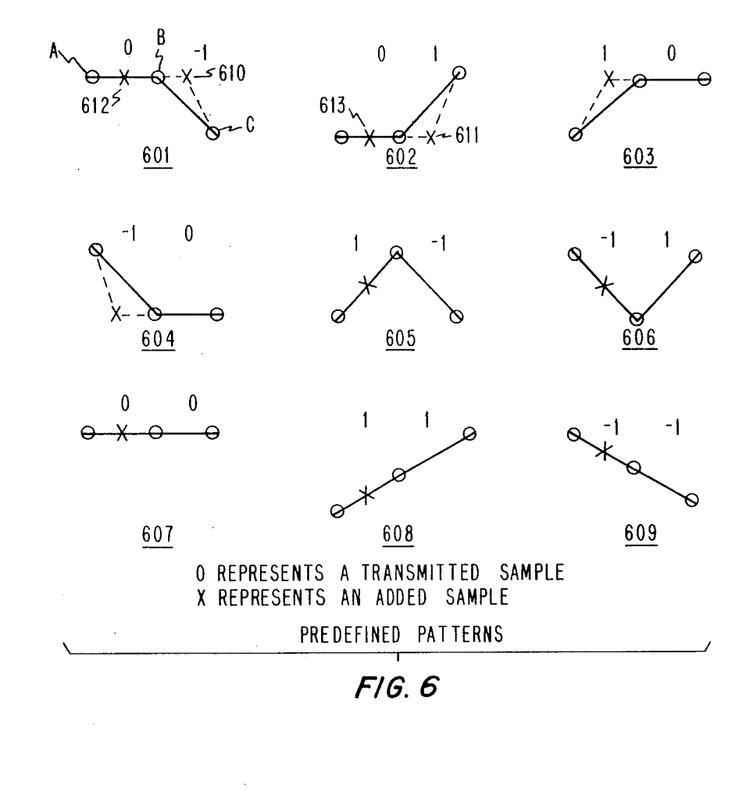
FIG. 6 illustrates in graphic form a set of predefined patterns in accordance with this invention.

FIG. 5 illustrates another logic circuit for crispening or improving the apparent resolution of a digital video signal. The circuit of FIG. 5 inserts one or more additional samples between received digitized samples from input bus 501, which are grouped into sets of three samples, by comparing each set of samples with the patterns illustrated in FIG. 6. Patterns 603 through 609 in FIG. 6 are identical to patterns 203 through 209 of FIG. 2 with respect to the received digital samples and the inserted digital samples. Patterns 601 and 602 are the same as patterns 201 and 203 with respect to the received digital samples but differ in that the circuit of FIG. 5 inserts two samples rather than one sample per set of samples as is done by the circuit of FIG. 1. Sample 610 and sample 611 are inserted in addition to sample 612 and 613 into patterns 601 and 602, respectively. The insertion of samples 610 and 611 further crispens the received digital samples for patterns 601 and 602.

Elements 502 through 513 are identical to elements 102 through 113 of FIG. 1. Multiplexer 520 is equivalent to elements 121 through 122 of FIG. 1, and multiplexer 524 is equivalent to elements 123 through 125 of FIG. 1. Range parameter calculator 528 is similar in operation to element 128 of FIG. 1. The occurrence of patterns 601 and 602 in the input video signal is detected by AND gate 521 in conjunction with comparators 507 and 510. When one of these patterns is detected, flipflop 522 is set and overrides the normal operation of the circuit of FIG. 5 during the next clock time.

Consider now the operation of the circuit of FIG. 5 with respect to pattern 601. Inserted sample 612 is identical to sample B. Sample 612 is inserted when fs, the clock signal, is a "0", by multiplexer 524 selecting the output of multiplexer 520 which in turn selects sample B. Multiplexer 520 is responsive to the output of gate 513 being a "1" to select sample B. During the next clock cycle, old sample B becomes new sample A, old sample C becomes new sample B, and the next input sample from bus 501 becomes new sample C. Since flipflop 522 is set, the circuit of FIG. 5 is effectively inhibited from examining this new set of samples in the normal manner. Rather flipflop 522 controls multiplexer 524 to select the output of delay 504 which is equivalent to the previous sample B and to output this sample twice onto output bus 517 during this next clock cycle. This results in the sample B of pattern 601 being transmitted three times on bus 517. Pattern 602 is handled in a similar manner.

It is to be understood that the above-described embodiment is merely illustrative of the principles of the invention and that other arrangements may be devised by those skilled in the art without departing from the spirit and scope of the invention. In particular, it would be obvious to one skilled in the art to implement the circuits of FIGS. 1 and 5 by a digital signal processor appropriately programmed. Further, it would be obvious to one skilled in the art that a video signal could be enhanced along the vertical scan direction as well as the horizontal scan direction using the principles of this invention.

What is claimed is:

1. An arrangement for improving the resolution of a video picture by processing a baseband video signal used for transmission and storage of said video picture to compensate for degraded rise and fall times of said video signal, comprising:
    means for grouping a plurality of digitized multivalued samples representing said baseband video signal into a plurality of sets of samples wherein each of said sets of samples consists of a predefined number of said digitized multi-valued samples and each of said digitized multi-valued samples having a plurality of binary bits;
    means for calculating numerical values representing the arithmetic differences between samples of each of said sets of samples;
    means for logically determining which of a plurality of predefined patterns corresponds to each of said sets of samples on the basis of the calculated numerical values of each of said sets of samples; and
    means responsive to the determined one of said plurality of predefined patterns of samples for each of said sets of samples for inserting samples into each of said sets of samples.

2. The arrangement of claim 1 wherein said predefined number is three and two numerical values are calculated for each of said sets of samples and said determining means comprises means for designating that the determined one of said plurality of predefined patterns of samples for each of said sets of samples is of a first set of said plurality of predefined patterns upon the absolute value of one of said numerical values being less than a range value and the absolute value of the other one of said numerical values being other than less than said range value and further for designating that the determined one of said plurality of predefined patterns of samples for each of said sets of samples is of a second set of said plurality of predefined patterns upon the absolute value of both of said numerical values being less than said range value and further for designating that the determined one of said plurality of predefined patterns of samples for each of said sets of samples is of a third set of said plurality of predefined patterns upon the absolute value of both of said numerical values being other than less than said range value for each of said sets of samples;
    said inserting means comprises means responsive to said determined one of said plurality of predefined patterns of samples being of said second and third set of said plurality of predefined patterns for including a sample equal to the average of two of said samples of said one of said sets of samples into said one of said sets of samples; and
    said inserting means further comprises means responsive to said determined one of said plurality of predefined patterns of samples being of said first set of said plurality of predefined patterns for including a sample equal to one of two of said samples of said one of said sets of samples into said one of said set.

3. The arrangement of claim 2 wherein said calculating means comprises means responsive to each of said sets of samples for generating said range value for each of said sets of samples whereby said range value represents the difference between samples of each said sets of samples.

4. The arrangement of claim 3 wherein said generating means comprises means for obtaining the differences between each of said samples for each of said sets of samples;
    means for locating the maximum difference between said samples of each of said sets of samples; and
    means for dividing said located maximum difference by a predefined value to calculate said range value.

5. The arrangement of claim 1 wherein said predefined number is three and two numerical values are calculated for each of said sets of samples and said determining means comprises means for sequentially designating that the determined one of said plurality of predefined patterns of samples for each of said sets of samples is of a first set of said plurality of predefined patterns upon the absolute value of the numerical values between the first and second of said samples being less than said range value and the absolute value of the numerical values between the second and the third of said samples being other than less than said range value and otherwise sequentially designating that the determined one of said plurality of predefined patterns of samples for each of said sets of samples is of a second set of said plurality of predefined patterns consisting of all other of said plurality of predefined patterns;

said inserting means comprises means responsive to said determined one of said plurality of predefined patterns of samples being of said first set of said plurality of predefined patterns for including two samples equal to one of two of said samples of the present one of said sets of samples into said present one of said sets of samples; and said inserting means further comprises means responsive to said determined one of said plurality of predefined patterns of samples being of said second set of said plurality of predefined patterns for including a sample equal to the average of two of said samples of the present one of said sets of samples upon the previous one of said sets of samples being other than of said first set of said plurality of predefined patterns.

6. The arrangement of claim 5 wherein said calculating means comprises means responsive to each of said sets of samples for generating said range value for each of said sets of samples.

7. The arrangement of claim 6 wherein said generating means comprises means for obtaining the differences between each of said samples for each of said sets of samples;

means for locating the maximum difference between said samples of each of said sets of samples; and means for dividing said located maximum difference by a predefined value to calculate said range value.

8. A method for improving the resolution of a video picture by processing a baseband video signal used for transmission and storage of said video picture to compensate for degraded rise and fall times of said video signal, comprising:

grouping a plurality of digitized multivalued samples representing said baseband video signal into a plurality of sets of samples wherein each of said sets of samples consists of a predefined number of said samples and each of said digitized multivalued samples having a plurality of binary bits;

calculating numerical values representing the arithmetic difference between samples of each of said sets of samples;

logically determining which of a plurality of predefined patterns corresponds to each of said sets of samples on the basis of the calculated numerical values of each of said sets of samples; and inserting samples into each of said sets of samples in response to the determined one of said plurality of predefined patterns of samples for each of said sets of samples.

9. The method of claim 8 wherein said predefined number is three and two numerical values are calculated for each of said sets of samples and said determining step comprises steps of designating that the determined one of said plurality of predefined patterns of samples for each of said sets of samples is of a first set of said plurality of predefined patterns upon the absolute value of one of said numerical values being less than said range value and the absolute value of the other one of said numerical values being other than less than said range value;

designating that the determined one of said plurality of predefined patterns of samples for each of said sets of samples is of a second set of said plurality of predefined patterns upon the absolute value of both of said numerical values being less than said range value;

designating that the determined one of said plurality of predefined patterns of samples for each of said sets of samples is of a third set of said plurality of predefined patterns upon the absolute value of both of said numerical values being other than less than said range value for each of said sets of samples;

said inserting step comprises the step of including a sample equal to the average of two of said samples of said one of said sets of samples into said one of said sets of samples in response to said determined one of said plurality of predefined patterns of samples being of said second and third set of said plurality of predefined patterns; and said inserting step further comprises the step of including a sample equal to one of two of said samples of said one of said sets of samples into said one of said set in response to said determined one of said plurality of predefined patterns of samples being of said first set of said plurality of predefined patterns.

10. The method of claim 9 wherein said calculating step comprises the step of generating said range value for each of said sets of samples in response to each of said sets of samples whereby said range value represents the difference between samples of each of said sets of samples.

11. The method of claim 10 wherein said generating step comprises steps of obtaining the differences between each of said samples for each of said sets of samples;

locating the maximum difference between said samples of each of said sets of samples; and dividing said located maximum difference by a predefined value to calculate said range value.

12. The method of claim 8 wherein said predefined number is three and two numerical values are calculated for each of said sets of samples and said determining step comprises steps of sequentially designating that the determined one of said plurality of predefined patterns of samples for each of said sets of samples is of a first set of said plurality of predefined patterns upon the numerical value representing the arithmetic difference between the first and second of said samples being less than said range value and the numerical value representing the arithmetic difference between the second and the third of said samples being other than less than said range value and otherwise sequentially designating that the determined one of said plurality of predefined patterns of samples for each of said sets of samples is of a second set of said plurality of predefined patterns consisting of all other of said plurality of predefined patterns;

said inserting step comprises the step of including two samples equal to one of two of said samples of the present one of said sets of samples into said present one of said sets of samples in response to said determined one of said plurality of predefined patterns of samples being of said first set of said plurality of predefined patterns; and said inserting step further comprises the step of including a sample equal to the average of two of said samples of the present one of said sets of samples in response to said determined one of said plurality of predefined patterns of samples being of said second set of said plurality of predefined patterns in the previous one of said sets of samples being other than of said first set of said plurality of predefined patterns.

13. The method of claim 12 wherein said calculating step comprises generating said range value for each of said sets of samples in response to each of said sets of samples.

14. The method of claim 13 wherein said generating step comprises steps of obtaining the differences between each of said samples for each of said sets of samples;

locating the maximum difference between said samples of each of said sets of samples; and dividing said located maximum difference by a predefined value to calculate said range value.

* * * * *